Dec. 25, 1956  L. PRICE  2,775,038
GAUGE MOUNTING ASSEMBLY
Filed May 20, 1955  2 Sheets-Sheet 1

INVENTOR.
LEO PRICE

Dec. 25, 1956  L. PRICE  2,775,038
GAUGE MOUNTING ASSEMBLY
Filed May 20, 1955  2 Sheets-Sheet 2
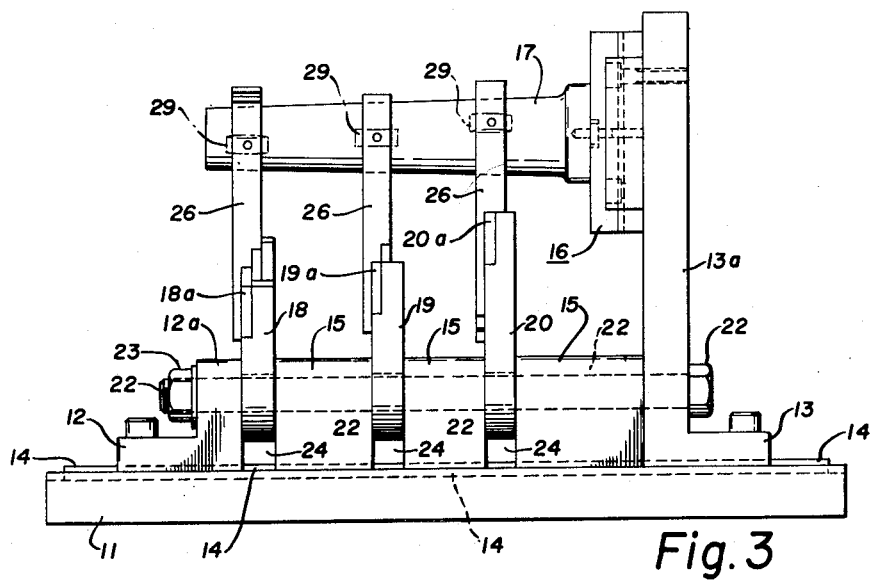
Fig. 3
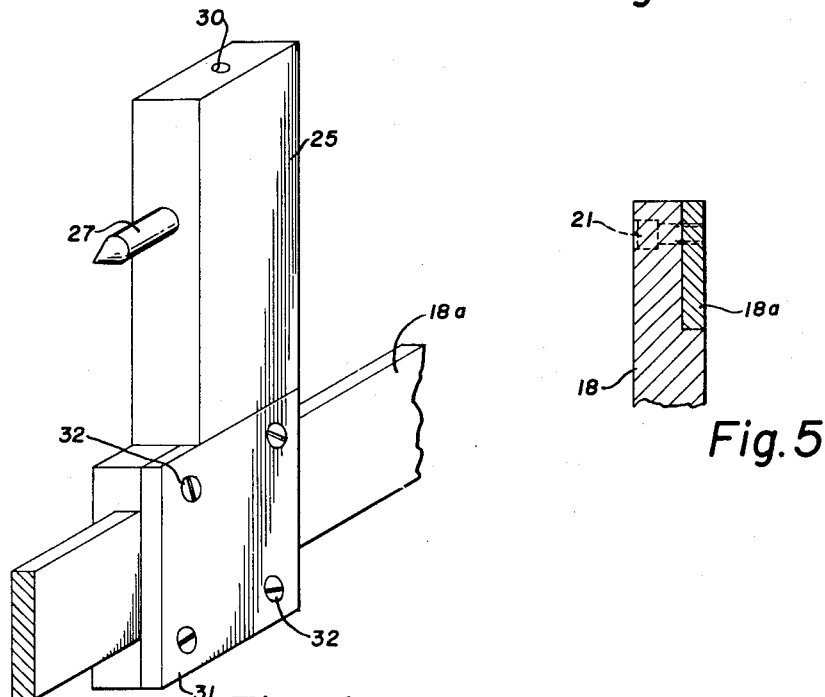
Fig. 4
Fig. 5
INVENTOR.
LEO PRICE.
BY 2,775,038
Patented Dec. 25, 1956

2,775,038

GAUGE MOUNTING ASSEMBLY

Leo Price, Cleveland Heights, Ohio

Application May 20, 1955, Serial No. 509,710

7 Claims. (Cl. 33—174)

My invention relates to mountings for gauging fingers used in the gauging of articles.

An object of my invention is the provision of an improved assembly of parts arranged for flexibility in obtaining the construction required for an article to be gauged.

Another object is the provision of an improved gauge mounting arranged for gauging an article at locations along its length at a different angular disposition at each location.

Another object is the provision of a mounting for gauge fingers so constructed as to permit different arrangements and disposition of the gauge fingers.

Another object is the provision of a base member and gauge finger supporting members so constructed and arranged that the gauge fingers may be mounted thereon in a plurality of positions and at desired angles.

Another object is the provision of standard parts for gauge mounting so constructed as to provide for flexibility in arranging a plurality of gauging positions for gauge fingers.

Another object is the provision of an improved gauge mounting arranged to hold pairs of gauge fingers in different angular positions along the length of an article to be gauged.

Another object is the provision for economy and efficiency in the construction of mounting means for gauge fingers.

Another object is the provision of an improved construction of a mounting for gauge fingers adapted for flexibility in the gauging of different articles.

Another object is the provision for obtaining results not heretofore known and in a manner not heretofore obtainable.

Other objects and a fuller understanding of my invention may be had by referring to the following description and claims, taken in conjunction with the accompanying drawings, in which:

Figure 3 is a side view of a device embodying my invention and looking in the direction of the arrows 3—3 of Figure 1;

Figure 4 is an enlarged view of a portion of my device showing the mounting of a gauge-finger holding member upon the straight arm portion of a supporting member; and Figure 5 is an enlarged sectional view taken through the line 5—5 of Figure 2.

Figure 1:
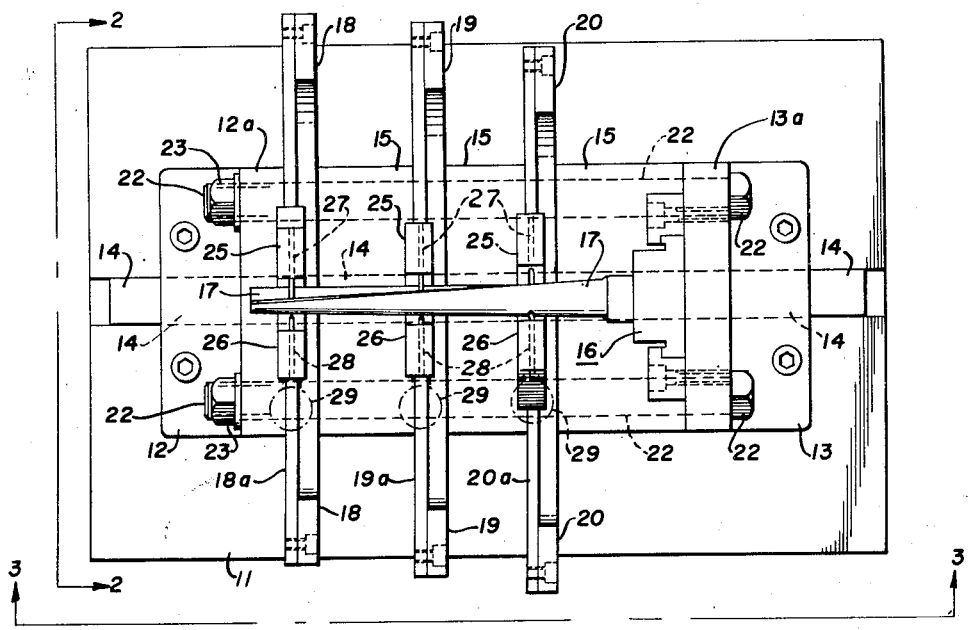
Figure 1 is a plan view of a gauging device embodying my invention.

With reference to the views of the drawings, the device illustrated incorporates a flat base member 11 having a top surface disposed in a horizontal plane. The base member 11 has a longitudinal slot running lengthwise thereof along its upper surface and intermediate the side edges of the base member. This longitudinal slot accommodates a long key or bar 14 which closely interfits in this slot.

Disposed along the base member 11 and over the key 14 in a line or row are an L-shaped end member 12, three spacer blocks 15 and an L-shaped end member 13. The members 12, 13 and 15 have keyways which accommodate the long key 14 so that the members 12, 13 and 15 are keyed to the base member 11 and held in alignment by the key 14. The end members 12 and 13 and several spacer blocks 15 are so arranged and spaced as to leave the three slots or open spaces 24.

The end member 12 has an upright portion denoted by the reference character 12–a. The bottom or base portion of the end member 12 is bolted by two threaded bolts to the base member 11. The end member 13 has an upright portion denoted by the reference character 13–a. The base or flat portion of the end member 13 is bolted to the base member 11 by two threaded bolts. The upright portion 13–a is longer than the upright portion 12–a and is arranged to support an orienting device, denoted generally by the reference character 16, which is secured in a suitable manner to the upper portion 13–a.

The orienting device 16 is adapted to support and orient an article 17 being gauged. Because one of the important uses of a gauge such as the one disclosed is gauging of articles such as a turbine blade having a twisting contour, the article 17 is shown as such a turbine blade or bucket. The orienting device 16 orients the article 17 along a primary reference line which is disposed in a horizontal plane and parallel to the plane of the base member 11. The article 17 is so held or oriented that it may be properly gauged at predetermined locations along its length and from varying angles relative to the horizontal plane.

Positioned in each of the slots or open spaces 24 is a supporting member or cross-piece disposed transversely of the base member. As there are three locations along the length of the article 17 to be gauged, in the illustrated form of my device, there are three supporting members or cross-pieces denoted by the reference characters 18, 19 and 20. Each supporting member of the plurality of supporting members 18, 19 and 20 has a portion in the form or shape of a portion of a circle, the circle in each case being generated around the primary reference line along which the article 17 is oriented. Also made part of each supporting member is a straight arm portion secured to the opposite ends of the arcuate portion by threaded bolts 21. The supporting member 18 has a straight arm portion 18–a extending as a chord to the circle, of which the arcuate portion is a portion; the supporting member 19 has a straight arm portion 19–a, which is a chord to a similar circle; and the supporting member 20 has a straight arm portion 20–a which is also a chord to a similar circle. The circles forming the arcuate portions of the supporting members 18, 19 and 20 are of the same radius and are all generated around the same primary reference line in which the article 17 is disposed. The chords along the straight arm portions 18–a, 19–a and 20–a are of the same length.

Each of the supporting members 18, 19 and 20 have a pair of parallel and equally spaced openings extending therethrough, these openings being formed in the arcuate portion of each supporting member. The spacing of the openings is the same for each of the supporting members but the position of each pair of openings relative to the respective straight arm portion for the supporting member varies with each of the supporting members. These openings have axes disposed on a circle generated around the same primary reference line, along which the article is disposed. A straight line joining the axes of the pair of openings in each supporting member forms a chord to the said circle. The chord joining the axes of the pair of openings in one supporting member is arranged at a different angular disposition relative to the disposition of its straight arm portion for each of the three supporting members. For example, a straight line connecting the axes of the pair of openings in one supporting member is inclined at one angle to the straight arm portion of that supporting member; the straight line connecting the axes of the pair of openings in a second of the supporting members is at another angle to its respective straight arm portion; and the straight line connecting the axes of the pair of openings in the third supporting member is inclined at still another angle to its respective straight arm portion. Thus, the supporting members 18, 19 and 20 are the same in construction, except for the disposition of the pair of openings in their respective arcuate portions. By the term "angular disposition" there is included the thought of parallel relationship, as for example, the straight line connecting the axes of a pair of openings in a supporting member may be parallel to the respective straight arm portion of that supporting member, as well as having an included angle therebetween.

Figure 2:
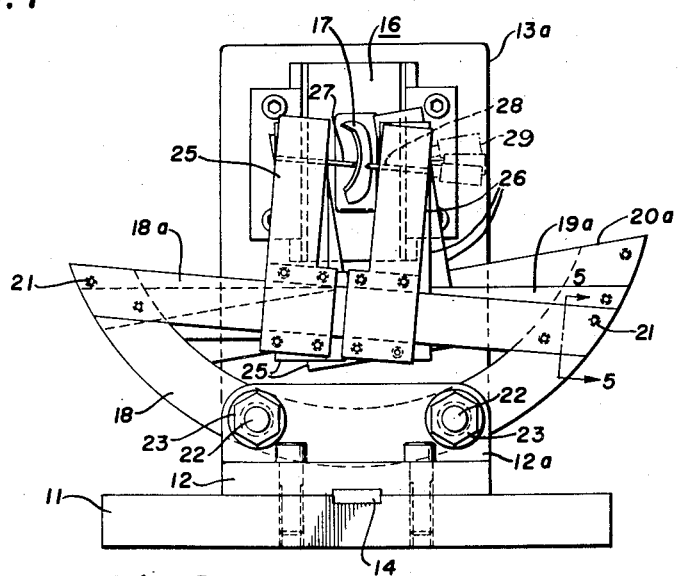
Figure 2 is an end view of the device embodying my invention and looking in the direction of the arrows 2—2 of Figure 1.

Each of the end members 12 and 13 and the three spacer blocks 15 have a pair of parallel and equally spaced openings extending therethrough, these openings being in alignment with each other and with the similarly spaced openings in the supporting members 18, 19 and 20. A pair of long bolts 22 extend through the aligned openings, respectively, in the end member 13, next spacer block 15, supporting member 20, next spacer block 15, supporting member 19, next spacer block 15, supporting member 18, and end member 12. A nut 23 is threadably secured to the threaded end of each of the bolts 22. The bolts 22 are aligning members which hold the end members, spacer blocks and supporting members in accurate alignment by reason of the bolts complementarily fitting into the registered or aligned openings in the end members, spacer blocks and supporting members. It is seen that by reason of the varied disposition of the pair of openings in each of the three supporting members that the straight arm portion for each supporting member is disposed at a different inclination to the others and to a horizontal plane. As seen in Figure 2, the straight arm portion 18–a of supporting member 18 is tilted at one angle, the straight arm portion 19–a of the supporting member 19 is tilted at another angle, and the straight arm portion 20–a of the supporting member 20 is tilted at still another angle. The variation of the disposition of these straight arm portions is obtained by the variation in the disposition of the pair of openings in the arcuate portions of each supporting member and by the fact that the pair of openings are held in alignment by the bolts 22 extending therethrough. It is to be noted that the bolts 22 and nuts 23 firmly clamp the supporting members 18, 19 and 20 in fixed position and all of the members 12, 13, 15, 18, 19 and 20 in rigid and predetermined positions relative to the base member.

Mounted on each of the straight arm portions are a pair of gauge finger holders, a left-hand holder 25 and a right-hand holder 26. These holders 25 and 26 are clamped to a straight arm portion by a plate 31 threadably secured by four threaded screws 32 to the holding member. The arrangement is such that by loosening the screws 32, each holding member may be slid and moved along the straight arm portion to a desired position and thereafter the screws 32 may be tightened to firmly clamp the holders in fixed position on the straight arm portions of the supporting members. Movement of the holders 25 and 26 is along a line which is determined by the angular disposition of the respective straight arm portions of the supporting members. For example, the holders 25 and 26 may be moved along a line determined by the angular disposition of the straight arm portion 18–a of the supporting member 18. Likewise, the holders on each of the straight arm portions 19–a and 20–a are movable along lines determined by the angular disposition of the respective straight arm portions. The position of each pair of holding members 25 and 26 is determined by the article, such as article 17, to be gauged and at those positions the holding members 25 and 26 are clamped in position to the straight arm portion carrying the holders.

Each of the holders holds or carries a gauge finger. The left-hand holders 25, three in number, have mounted thereto a fixed gauge finger 27. The position in extension of each gauge finger relative to a holder 25 is determined by a set screw 30 which clamps a finger 27 in position to its respective holder 25. Carried by each right-hand holder 26 is a movable finger 28 biased to move inwardly toward an opposed finger 27. Mounted to each holder 26 is a gauge dial 29 which indicates the gauging position of a respective finger 28. The gauging of an article positioned between the gauge fingers 27 and 28 of each pair of gauge fingers is obtained by having opposed fingers press against the article at the gauging location and by reading of the respective indicating dial 29 (shown diagrammatically in broken lines).

It is to be seen that by the different angular dispositions of the holders 25 and 26 the opposed fingers 27 and 28 are inclined at a different angle to the horizontal for each of the pairs of fingers. One pair of fingers may be in horizontal plane, another pair of fingers may be directed at a plane at an angle to that horizontal plane and a third pair of fingers may be directed in a plane at still another angle to that horizontal plane. Thus, the approach or angular disposition of the several pairs of opposed gauging fingers is different for each of the pairs of gauging fingers. Because of the twisting contour of the article 17, such as a turbine blade or bucket, it is desired to gauge the article at these various angles at the several locations along the length of the article. The opposed fingers are directed toward the article in relationship to the primary reference line which extends axially of the article and in a horizontal plane.

It is to be seen that my mounting may be made up of standard parts which are adapted for different shapes and sizes of articles to be gauged. The only variation in the several supporting members is in the disposition of the openings in the arcuate portions of the supporting members through which the long bolts 22 extend. By appropriately drilling these openings in supporting members at the required locations, the angular dispositions of the straight arm portions of each supporting member may be obtained and hence the angular position of the opposed fingers carried by such a supporting member may be determined for a certain article to be gauged.

An inventory of parts to make up gauge mountings for different articles may be kept and the only variations that need to be made to obtain angular disposition of the gauge fingers is in the positioning of the openings to be drilled for accommodating the long bolts 22. Variation in the spacing of the gauge fingers along the length of the article may be varied by changing the length of the respective spacer blocks 15. Different length articles may be accommodated and the number of locations and the position of the locations to be gauged may be varied by changing the number and size of the spacer blocks 15 to be clamped between the end members 12 and 13. My device provides for great flexibility and versatility in the assembling of gauge mountings for different uses with a minimum of standard parts and with a minimum of changes to be made in standard parts.

The present disclosure includes that contained in the appended claims as well as that in the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A mounting for a gauging device utilized for gauging an article having a varying contour along its length, comprising a longitudinally extending base member disposed in a plane substantially parallel to said reference line, said base member having a pair of spaced and parallel openings extending therealong, said base member having a plurality of transverse and parallel slots spaced apart and intersecting both said openings, a plurality of cross-pieces, each of said cross-pieces having an anchoring portion disposed in a respective transverse slot and having an arm portion disposed outwardly of, and in a plane parallel to, said slot, a pair of holding members carried by each said arm portion and movable therealong, each holding member of said pairs of holding members being adapted to hold a gauging finger, directed toward the other holding member to gauge a said article between opposed gauging fingers, the angular disposition of said gauging fingers relative to said base member being determined by the angular disposition of the arm portion of the cross-piece carrying the respective pair of holding members, the anchoring portion of each said cross-piece having a pair of spaced open spaces provided therein, the axes of said open spaces in each cross-piece being disposed on a circle generated around said reference line embraced by said holders and along which a said article being gauged is to be disposed, the chord on the circle extending between the axes of the open spaces of each pair of open spaces being angularly disposed relative to the arm portion of said each cross-piece differently for each of said cross-pieces, a pair of aligning members extending through the said openings, respectively, of the base member and through the open spaces, respectively, in the anchoring portion of each of the said cross-pieces whereby said chords are disposed parallel to each other and in the same plane, and support means carried by the base member for supporting an orienting device for the orienting of a said article between said gauging fingers, the variation in the angular disposition of the arm portions and the said chords for the respective cross-pieces providing for corresponding variations in the line of movement of the pairs of holders along the arm portions of the respective cross-pieces.

2. In a gauge mounting, the combination of a base member having a pair of openings extending therealong, said openings having parallel axes, a plurality of cross-pieces each having straight slide portion adapted to slidably carry therealong a pair of holders for gauge fingers movable relative to each other to gauge an article disposed along a reference line between the gauge fingers, each of said cross-pieces having a pair of holes extending therethrough, said holes of each pair of holes having parallel axes disposed on a circle generated around said reference line, the said axes for each pair of holes being disposed on a chord of said circle inclined at an angle to the corresponding chord for each other pair of holes, said pairs of openings in the base member and said pairs of holes in the cross-pieces being in alignment, aligning means securing said openings and holes in alignment, the varying angular disposition of said chords providing for varied angular disposition of the slide portions of said cross-pieces relative to the plane of said base member.

3. A mounting for a gauge utilized in gauging an article at different locations along its length and at different angles at said locations relative to a reference plane passing through a primary reference line, comprising a base member, a plurality of gauge supporting members carried by said base member and arranged in a row at spaced intervals corresponding with said locations, each said supporting member having an arm portion providing a secondary reference line determining the said angle of the gauging at the respective location, each said supporting member having a pair of uniformly spaced interlocking means disposed on a circle generated around said primary reference line, said base member having a pair of aligned interlocking means, the interlocking means of the base member and supporting members locking said supporting means to said base member to hold said supporting members in said row at said spaced intervals, a straight line between the interlocking means of each of said supporting members being disposed at an angle to said reference plane different from the angle of the corresponding straight line between the interlocking means of the other supporting members, the variation in the disposition of said straight lines varying the angularity of the said arm portions of the supporting members to said reference plane.

4. A gauging device comprising the combination of a base member, means carried by the base member for supporting an orienting device relative to a reference line substantially passing parallel to said base member, said base member having a pair of openings extending therealong parallel to each other and to said reference line, a plurality of supporting members each having a pair of parallel openings extending therethrough, said openings in the supporting members being registered with the openings in the base member, spacing means carried by the base member for spacing said supporting members apart along said base member and substantially parallel to each other, aligning means maintaining the pair of openings of the base member and pairs of openings of the support members in registration, each said supporting member having an arm portion, a pair of holding members mounted to each said arm portion, each said holding member being adapted to hold a gauge finger for gauging an article interposed between the fingers of each pair of holders and along said reference line, said arm portion of each said supporting member being disposed along a line determining the angular disposition of said pair of holding members mounted thereto and of the fingers held by the said holding members, the angular disposition of a straight line between the axes of the openings in each said supporting member relative to the said line of the arm portion being different for each of said supporting members.

5. A gauging device for mounting pairs of opposed gauging fingers in a plurality of planes disposed at angles to each other to gauge an article disposed between opposed fingers, comprising the combination of a base member, a plurality of supporting members arranged parallel to each other, spaced from each other, and mounted along said base member in a row, each said supporting member having an arm portion for carrying a pair of holders for gauge fingers, said arm portion of each supporting member being along a line determining the angular disposition of the holders carried thereby, each said supporting member having a pair of spaced parallel openings extending therethrough and disposed on a circle generated around a reference line common to all said supporting members, a straight line between the axes of the openings of each supporting member being a first chord on said circle and the said line of the arm portion being a second and greater chord on said circle, the angular disposition of the said chords relative to each other for each supporting member being different than that for each other supporting member, and parallel aligning means carried by the base member and extending through the openings of said supporting members for holding in alignment the openings of said pairs of openings, respectively, in said supporting members.

6. In a mounting for gauge fingers arranged in spaced pairs of opposed fingers, each pair being disposed along a line at an angle to each other pair, comprising the combination of a plurality of pairs of holding members for holding said pairs of fingers, respectively, said pairs of holding members being spaced apart and the holding members of each pair opposing each other, a plurality of supporting members for supporting said pairs of holding members, respectively, each said supporting member having a straight arm portion to which the holding members of a pair of holding members is mounted, the angular disposition of each arm portion determining the angular disposition of said holding members and of the fingers held thereby, each said supporting member having a pair of equally spaced and parallel openings extending therethrough, the said openings in each supporting member being disposed on a line having an angular relationship to the disposition of the arm portion of the respective supporting member, the said angular relationship being different for each of said supporting members, a pair of parallel aligning members holding the respective openings of said pairs of openings of the supporting members in alignment, and base means securing said aligning members in fixed parallel relationship.

7. The combination of a base member, a plurality of supporting members each adapted to position gauging fingers in gauging location relative to an article to be gauged, said supporting members being arranged parallel to each other in spaced sequence along the base member, each supporting member having a straight arm portion adapted to carry gauge-finger holding members, the angular disposition of the holding members carried by a said straight arm relative to the plane of the base member being determined by the angular disposition of said straight portion, each said supporting member having a pair of parallel open spaces extending therethrough and equally spaced apart, a straight line between the axes of the open spaces of each supporting member having an angular relationship to the straight arm portion of the respective supporting member, said angular relationship varying in degree among said supporting members, and a pair of parallel aligning members carried by the base member and extending through the respective pairs of open spaces of the supporting members to hold said open spaces in alignment, the alignment of said open spaces arranging in a plane the said straight lines between the axes of the open spaces in said supporting members, the varying angular relationship of said straight lines and said straight arm portions providing for corresponding angular dispositions of the gauge-finger holding members carried by the respective straight arm portions.

References Cited in the file of this patent

UNITED STATES PATENTS

| 482,911 | Adler | Sept. 20, 1892 |
| 2,495,891 | Davis | Jan. 31, 1950 |

FOREIGN PATENTS

| 369,878 | Great Britain | Mar. 31, 1932 |